(12) United States Patent
Roberts et al.

(10) Patent No.: US 9,380,331 B2
(45) Date of Patent: Jun. 28, 2016

(54) DYNAMIC HELP CONTENT PRESENTATION METHODS AND SYSTEMS

(75) Inventors: Brian F. Roberts, Dallas, TX (US); Donald H. Relyea, Dallas, TX (US); Anthony M. Lemus, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 628 days.

(21) Appl. No.: 12/976,652

(22) Filed: Dec. 22, 2010

(65) Prior Publication Data
US 2012/0166945 A1 Jun. 28, 2012

(51) Int. Cl.
| | | |
|---|---|---|
| H04N 21/422 | (2011.01) | |
| G06F 3/048 | (2013.01) | |
| G06F 9/44 | (2006.01) | |
| H04N 21/41 | (2011.01) | |
| H04N 21/433 | (2011.01) | |
| H04N 21/45 | (2011.01) | |
| H04N 21/488 | (2011.01) | |
| G06F 3/0484 | (2013.01) | |
| H04N 21/4147 | (2011.01) | |
| H04N 21/442 | (2011.01) | |
| H04N 21/472 | (2011.01) | |

(52) U.S. Cl.
CPC ........ *H04N 21/42204* (2013.01); *G06F 3/0484* (2013.01); *G06F 9/4446* (2013.01); *H04N 21/4122* (2013.01); *H04N 21/4126* (2013.01); *H04N 21/4147* (2013.01); *H04N 21/44222* (2013.01); *H04N 21/4532* (2013.01); *H04N 21/488* (2013.01); *H04N 21/4334* (2013.01); *H04N 21/47214* (2013.01)

(58) Field of Classification Search
CPC ... H04N 21/482; H04N 21/472; H04N 21/47; H04N 21/4126; H04N 21/4147; H04N 21/488; H04N 21/4532; H04N 21/47214; H04N 21/4122; H04N 21/42204; H04N 21/44222; H04N 21/4334
USPC .................................................. 715/708, 705
See application file for complete search history.

(56) References Cited

U.S. PATENT DOCUMENTS

| | | | | |
|---|---|---|---|---|
| 5,774,357 | A * | 6/1998 | Hoffberg et al. .............. | 713/600 |
| 5,781,246 | A * | 7/1998 | Alten et al. ...................... | 725/40 |
| 6,584,496 | B1 * | 6/2003 | Ludtke .......................... | 709/217 |
| 7,007,240 | B1 * | 2/2006 | Anderson et al. ............. | 715/790 |
| 7,783,702 | B2 * | 8/2010 | Liu et al. ....................... | 709/204 |
| 8,001,470 | B1 * | 8/2011 | Chen et al. .................... | 715/714 |
| 8,078,096 | B2 * | 12/2011 | Rao .............................. | 455/3.04 |
| 8,151,192 | B2 * | 4/2012 | Black et al. ................... | 715/708 |
| 8,707,177 | B1 * | 4/2014 | Parle et al. .................... | 715/705 |
| 2003/0001875 | A1 * | 1/2003 | Black et al. ................... | 345/708 |
| 2003/0016238 | A1 * | 1/2003 | Sullivan et al. ............... | 345/705 |
| 2005/0154985 | A1 * | 7/2005 | Burkhart et al. .............. | 715/705 |
| 2005/0166230 | A1 * | 7/2005 | Gaydou et al. ................. | 725/41 |
| 2005/0192051 | A1 * | 9/2005 | Tokuhashi ................. | 455/556.1 |

(Continued)

*Primary Examiner* — Amy M Levy (57) ABSTRACT

An exemplary method includes a dynamic help content presentation system detecting a user input command provided by a user, the user input command requesting help with content being presented by a media content access subsystem, identifying, in response to the user input command, a context of the content being presented by the media content access subsystem, and automatically presenting help content associated with the identified context by way of a mobile device while the content is being presented by the media content access subsystem. Corresponding methods and systems are also disclosed.

15 Claims, 10 Drawing Sheets

(56) References Cited

U.S. PATENT DOCUMENTS

| | | |
|---|---|---|
| 2006/0036991 A1* | 2/2006 | Biazetti et al. ............... 717/104 |
| 2006/0117315 A1* | 6/2006 | Bussert et al. ............... 717/174 |
| 2006/0195790 A1* | 8/2006 | Beaupre et al. ............... 715/727 |
| 2007/0028270 A1* | 2/2007 | Ostojic et al. ................ 725/53 |
| 2007/0136753 A1* | 6/2007 | Bovenschulte et al. ......... 725/46 |
| 2008/0229198 A1* | 9/2008 | Jung et al. ................... 715/708 |
| 2008/0229362 A1* | 9/2008 | White et al. ................... 725/47 |
| 2009/0102859 A1* | 4/2009 | Athsani .................. G06F 3/011 345/619 |
| 2009/0199097 A1* | 8/2009 | Black et al. .................. 715/708 |
| 2009/0253463 A1* | 10/2009 | Shin et al. .................... 455/563 |
| 2009/0285492 A1* | 11/2009 | Ramanujapuram et al. .. 382/209 |
| 2010/0167788 A1* | 7/2010 | Choi ............................ 455/566 |
| 2010/0180200 A1* | 7/2010 | Donneau-Golencer et al. ............................ 715/705 |
| 2010/0318505 A1* | 12/2010 | Fisher et al. ................. 707/706 |
| 2011/0085526 A1* | 4/2011 | Joseph et al. ................ 370/338 |
| 2011/0246880 A1* | 10/2011 | Horton et al. ................ 715/708 |
| 2012/0042002 A1* | 2/2012 | Smith et al. .................. 709/203 |
| 2012/0210349 A1* | 8/2012 | Campana et al. ............... 725/32 |

* cited by examiner

DYNAMIC HELP CONTENT PRESENTATION METHODS AND SYSTEMS

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box device.

Some features available by way of a set-top box device can be confusing and difficult to learn for certain users. Hence, it is often desirable for a user to be able to access help content associated with a particular set-top box feature while the user is attempting to use the set-top box feature. Unfortunately, the help content is typically displayed on the same display device (e.g., a television connected to the set-top box device) that displays an interface associated with the set-top box feature. This either prevents the user from being able to have concurrent access to the help content and the feature interface or limits the amount of space that can be dedicated to both the help content and the feature interface. In some instances, a user may alternatively access help content online and view the help content while attempting to figure out how to use the set-top box feature. However, it can sometimes be difficult to find online help content for a set-top box feature that is tailored to the specific needs of a user. Even if it can be found, it is difficult to manually update the online help content so that it remains contextually relevant to the set-top box feature.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for dynamically presenting help content associated with content being presented by a media content access subsystem are described herein. As described in more detail below, a dynamic help content presentation system may detect a user input command requesting help with content being presented by a media content access subsystem (e.g., a set-top box device and a television connected to the set-top box device). The user input command may be provided by a user of the media content access subsystem in any suitable manner. The dynamic help content presentation system may identify a context of the content being presented by the media content access subsystem and automatically present help content associated with the identified context by way of a mobile device (e.g., by way of an application being executed by a mobile phone device, a tablet computer, etc.) while the content is being presented by the media content access subsystem. As the context of the content being presented by the media content access subsystem changes, the dynamic help content presentation system may dynamically update the help content being presented by way of the mobile device so that the help content remains contextually relevant to the content being presented by the media content access subsystem.

As will be described in more detail below, the methods and systems described herein may facilitate an easy-to-use, convenient, and enjoyable media content access device experience for a user. In particular, the methods and systems described herein may allow a user to easily access and follow help content related to a particular feature associated with a media content access device (e.g., a set-top box device). In this manner, the user may more readily learn and use the various features associated with the media content access device.

As used herein, "content" that may be presented by a media content access subsystem may include any graphical content that may be presented for display on a display screen included in or otherwise associated with the media content access subsystem. For example, the content may include media content, program guide content, menu content, search content, Web content, etc. In some examples, the content is associated with one or more features (e.g., digital video recording ("DVR") features, interactive program guide features, menu features, operational features, etc.) of the media content access subsystem.

As used herein, "help content" refers to any content that may be presented by way of a mobile device and that may provide help, instructions, tutorials, troubleshooting content, demonstrations, and/or any other type of assistance to a user attempting to interact with or otherwise use a feature or other type of content that may be presented by a media content access subsystem. In some examples, help content may include interactive video content (e.g., a video tutorial), one or more widgets, and/or any other graphical content. Additionally or alternatively, help content may include audio content.

Figure 1:
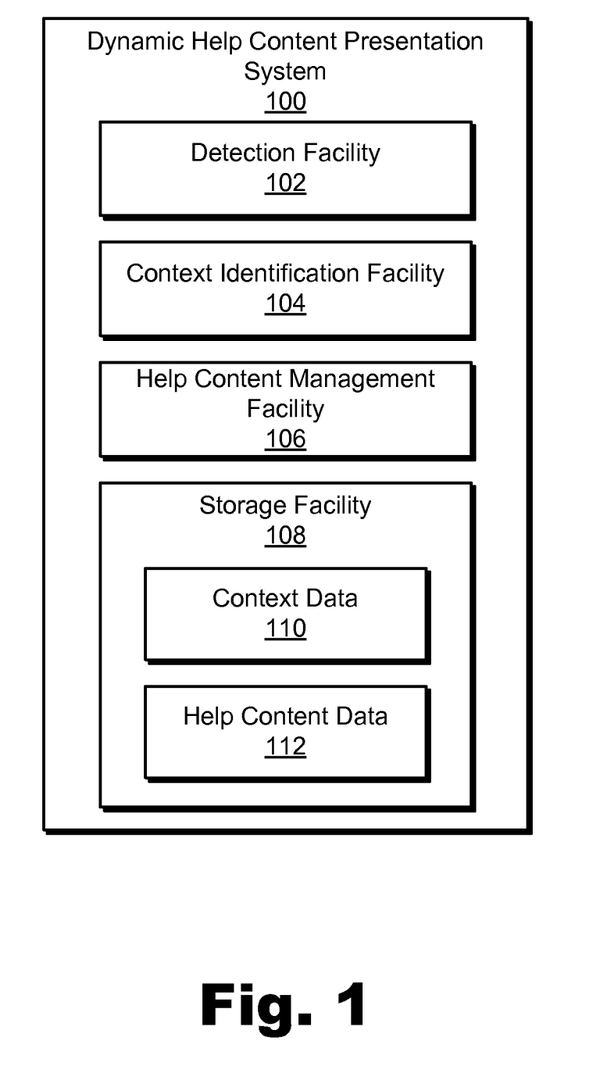
FIG. 1 illustrates an exemplary dynamic help content presentation system according to principles described herein.

FIG. 1 illustrates an exemplary dynamic help content presentation system 100 (or simply "system 100"). As described below, system 100 may be configured to dynamically present help content associated with content being presented by a media content access subsystem. System 100 may include a detection facility 102, a context identification facility 104, a help content management facility 106, and a storage facility 108, which may be in communication with one another using any suitable communication technologies. Each of these facilities will now be described.

Detection facility 102 may be configured to detect one or more user input commands provided by a user of a media content access subsystem. The one or more user input commands may be provided by the user in any suitable manner as may serve a particular implementation. For example, the user may provide the one or more user input commands using a remote control device associated with the media content access subsystem. Additionally or alternatively, the one or more input commands may be provided using a mobile device physically distinct from the remote control device and the media content access subsystem, one or more voice recognition systems, one or more gesture recognition systems, and/or any other type of device or system as may serve a particular implementation.

In some examples, detection facility 102 may be configured to detect a user input command requesting help with content being presented by the media content access subsystem. The user input command requesting help may be provided by a user while the content is being presented by the media content access subsystem and/or at any other time.

Context identification facility 104 may be configured to identify a context of content being presented by the media content access subsystem. For example, context identification facility 104 may identify a context of content being presented by the media content access subsystem in response to a user input command requesting help with the content. In this manner, as will be described below, system 100 may select and present contextually relevant help content associated with the content.

As used herein, a "context of content being presented by a media content access subsystem" refers to a particular presentation state of the media content access subsystem. For example, a particular context of content being presented by a media content access subsystem may refer to or be representative of a particular feature interface (e.g., a DVR interface), menu option (e.g., interactive program guide), media content instance (e.g., a movie or television program), or other content being presented by the media content access subsystem at a particular time. Additionally or alternatively, a context of content being presented by a media content access subsystem may refer to or be representative of a particular channel to which the media content access subsystem is tuned, an identity of the user interacting with the media content access subsystem, and/or any other factor associated with a presentation of content by the media content access subsystem.

Context identification facility 104 may identify a context of content being presented by a media content access subsystem in any suitable manner. For example, the media content access subsystem, a remote control device associated with the media content access subsystem, a server (e.g., a server associated with a service provider), and/or any other device may transmit data (e.g., metadata) representative of the context to context identification facility 104. In some examples, context identification facility 104 may direct the media content access subsystem to transmit (e.g., periodically) data representative of the context to context identification facility 104.

Context identification facility 104 may be further configured to detect one or more changes that may occur in the context of the content being presented by a media content access subsystem. For example, context identification 104 may detect that the media content presentation subsystem has switched from presenting one type of content to another type of content, switched from presenting a first graphical user interface (e.g., screen) associated with a particular feature (e.g., a DVR feature) to another graphical user interface associated with the same feature, etc. As will be described below, in response to a detected change in context, help content management facility 106 may dynamically update help content being presented by way of a mobile device to remain contextually relevant to the content being presented by the media content presentation subsystem.

Context identification facility 104 may detect a change in the context of content being presented by a media content access subsystem in any suitable manner. For example, the media content access subsystem, a remote control device associated with the media content access subsystem, a server (e.g., a server associated with a service provider), and/or any other device may transmit data (e.g., metadata) representative of the change in context to context identification facility 104. Additionally or alternatively, context identification facility 104 may detect one or more user input commands transmitted by a remote control device to the media content access subsystem. The one or more user input commands may be used to determine that a change in context has occurred.

Help content management facility 106 may be configured to manage (e.g., maintain, select, present, update, etc.) help content associated with content that may be presented by a media content access subsystem. For example, help content management facility 106 may be configured to automatically present help content associated with a context of content being presented by the media content access subsystem as identified by context identification facility 104. As will be illustrated below, the help content may be presented by way of a mobile device while the content is being presented by the media content access subsystem.

Help content management facility 106 may be further configured to dynamically update the help content being presented by way of the mobile device in response to a change in the context of the content being presented by the media content access subsystem. In this manner, as will be illustrated below, the help content presented by the mobile device may remain contextually relevant to the content being presented by the media content presentation subsystem.

Help content management facility 106 may be further configured to perform one or more operations described in the help content that is presented by a mobile device. For example, in response to a particular user input command (e.g., selection of a "show me" button), an operation (e.g., a particular step or action) described in help content being presented by the mobile device may be performed by help content management facility 106 so that the user may visually learn how to perform the operation.

Storage facility 108 may be configured to maintain context data 110 generated or utilized by context identification facility 104 and help content data 110 utilized by help content management facility 106. Storage facility 108 may maintain additional or alternative data as may serve a particular implementation.

Figure 2A:
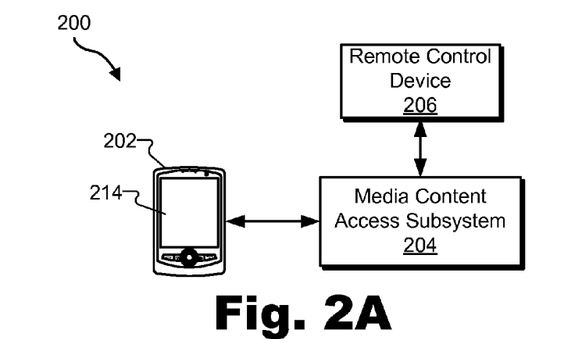
FIGS. 2A-2C illustrate exemplary implementations of the system of FIG. 1 according to principles described herein.
Figure 2B:
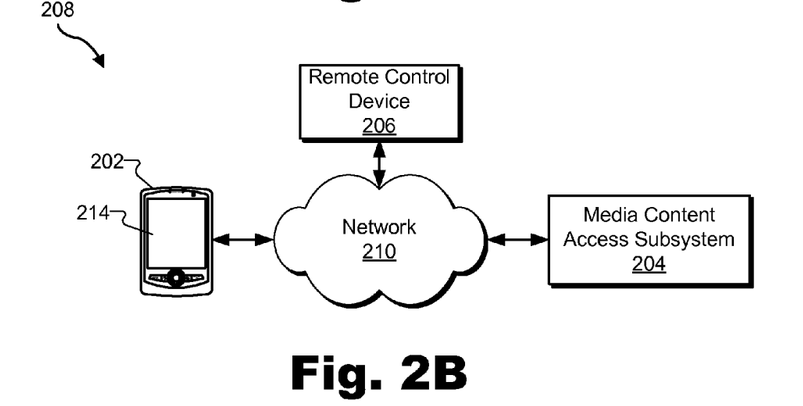
Figure 2C:
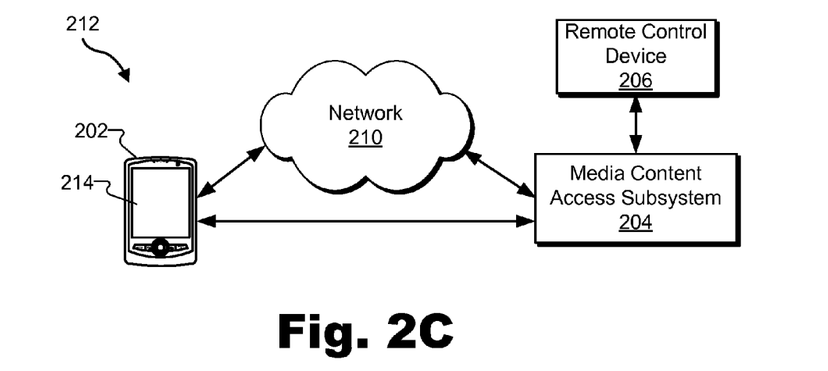

FIGS. 2A-2C illustrate exemplary implementations of system 100. Implementation 200 shown in FIG. 2A includes a mobile device 202 and a media content access subsystem 204 configured to communicate directly one with another. Implementation 200 may further include a remote control device 206 configured to communicate directly with media content access subsystem 204. Implementation 208 shown in FIG. 2B includes mobile device 202, media content access subsystem 204, and remote control device 206 configured to communicate by way of a network 210. Implementation 212 shown in FIG. 2C includes mobile device 202 and media content access subsystem 204 configured to communicate directly and by way of network 210. Implementation 212 may further include remote control device 206 configured to communicate directly with media content access subsystem 204. Implementation 212 may be a hybrid version of implementations 200 and 206 and may provide for certain communications between mobile device 202 and media content access subsystem 204 to be direct communications and other communications between mobile device 202 and media content access subsystem 204 to be by way of network 210.

Direct communications between mobile device 202 and media content access subsystem 204 may include infrared signals (e.g., infrared codes), radio frequency signals, Bluetooth connection signals, other wireless signals, signals transmitted over a direct wired connection between mobile device 202 and media content access subsystem 204, and any/or other suitable direct communications between mobile device 202 and media content access subsystem 204. Likewise, direct communications between remote control device 206 and media content access subsystem 204 may include infrared signals (e.g., infrared codes), radio frequency signals, Bluetooth connection signals, other wireless signals, signals transmitted over a direct wired connection between remote control device 206 and media content access subsystem 204, and any/or other suitable direct communications between remote control device 206 and media content access subsystem 204.

Communications between mobile device 202, remote control device 206, and media content access subsystem 204 by way of network 210 may include any suitable network-carried communications such as TCP, IP, TCP/IP, Wi-Fi, Ethernet, etc. connections. Network 210 may include one or more networks or types of networks (and communication links thereto) capable of carrying signals between mobile device 202, remote control device 206, and media content access subsystem 204. For example, network 210 may include, but is not limited to, one or more local area networks (e.g., a home Wi-Fi and/or Ethernet network).

Mobile device 202 may include any mobile computing device such as, but not limited to, a mobile phone, a smartphone, a personal digital assistant ("FDA"), a portable media player (e.g., an iPod or the like), a tablet computer (e.g., an iPad or the like), a mobile audio player, and/or any other suitable mobile device. As shown, a display screen 214 may be included as part of mobile device 202. Display screen 214 may be configured to display the help content presented by way of mobile device 202.

Mobile device 202 may implement one or more facilities 102-108 of system 100. For example, mobile device 202 may detect one or more user input commands provided by a user, identify a context of content being presented by media content access subsystem 204, and/or automatically present help content associated with an identified context. In some examples, system 100 is entirely implemented by mobile device 202.

Media content access subsystem 204 may include any combination of devices configured to present content that may have help content associated therewith. For example, media content access subsystem 204 may include a media content access device (e.g., a set-top box device, a digital video recording ("DVR") device, a multi-room DVR device, a media content processing device, a personal computer, a gaming device, a television device, a mobile device separate and distinct from mobile device 202, and/or any other device configured to facilitate access to one or more forms of content) communicatively coupled to a display device (e.g., a television device, display monitor, etc.) configured to display the content presented by the media content access device.

Media content access subsystem 204 may implement one or more facilities 102-108 of system 100. For example, media content access subsystem 204 may be configured to detect a change in a context of content being presented by media content access subsystem 204 and transmit data representative of the change in context to mobile device 202.

Remote control device 206 may include any computing device configured to remotely control one or more operations of media content access subsystem 204. For example, a user may utilize remote control device 206 to transmit one or more user input commands (e.g., a user input command requesting help with content being presented by media content access subsystem 204) to media content access subsystem 204.

Figure 3A:
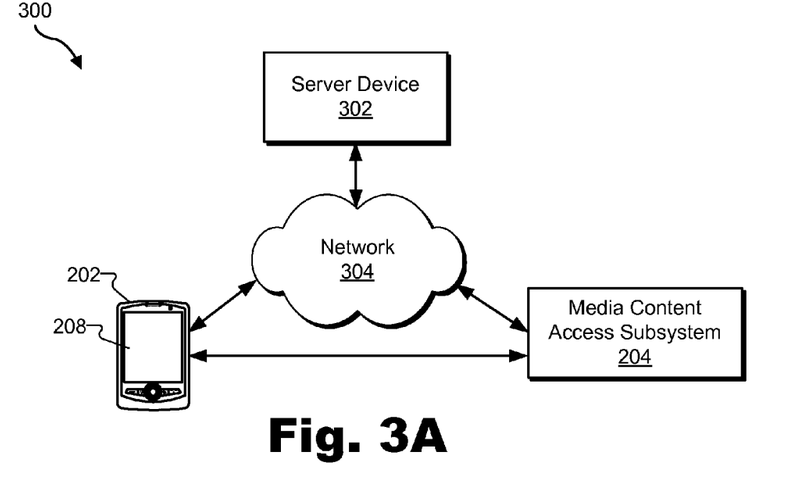
FIGS. 3A-3B illustrate additional exemplary implementations of the system of FIG. 1 according to principles described herein.
Figure 3B:
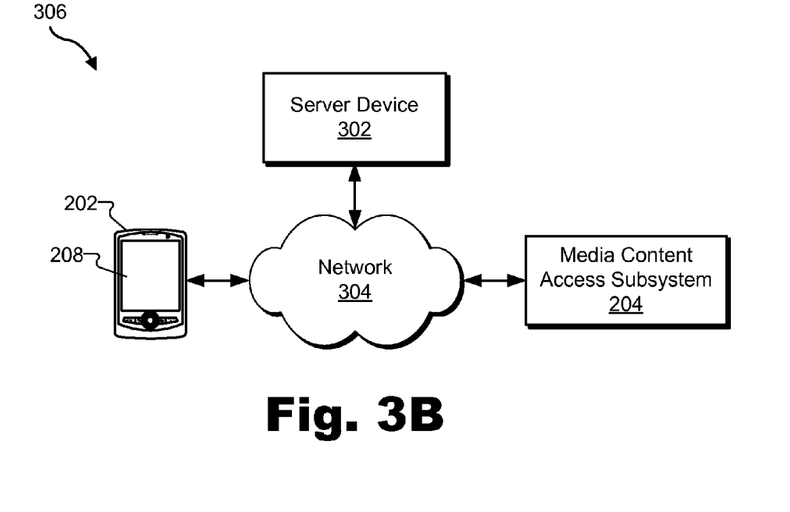

FIGS. 3A-3B illustrate additional exemplary implementations of system 100. Implementation 300 shown in FIG. 3A includes mobile device 202 and media content access subsystem 204 configured to communicate directly one with another and a server device 302 configured to communicate with either or both of mobile device 202 and media content access subsystem 204 by way of a network 304. Implementation 306 shown in FIG. 3B includes mobile device 202, media content access subsystem 204, and server device 302 configured to communicate with one another by way of network 304. In implementations 300 and 306, communications between mobile device 202 and media content access subsystem 204 may be as described above for implementations 200 and 208, respectively. In addition, at least one of mobile device 202 and media content access subsystem 204 may be configured to communicate with server device 302 by way of network 304 using any suitable network-based communication technologies (e.g., TCP, IP, TCP/IP, Wi-Fi, Ethernet, FTP, HTTP, HTTPS, SIP, SOAP, XML and variations thereof, Simple Mail Transfer Protocol ("SMTP"), RTP, UDP, etc. types of communications).

In addition or alternative to the examples of networks and types of networks that may be included in network 210, network 304 may include one or more additional or alternative networks or types of networks to support communications with server device 302, including, without limitation, wireless data networks (e.g., a mobile data network), subscriber television networks (e.g., broadcast, multicast, and/or narrowcast television networks), satellite networks, cable networks, hybrid fiber coax networks, broadband networks, the Internet, wide area networks, and any other networks capable of carrying data and/or communications signals between server device 302 and either or both mobile device 202 and media content access subsystem 204.

Accordingly, server device 302 may implement one or more facilities 102-108 of system 100. For example, server device 302 may be associated with (e.g., managed by) a service provider that provides the content presented by media content access subsystem 204 and may be accordingly configured to detect a change in a context of content being presented by media content access subsystem 204. Server device 302 may be further configured to transmit data representative of the change in context to mobile device 202 and/or perform one or more of the help content management operations (e.g., selecting and/or providing help content for presentation by way of mobile device 202) described herein.

Figure 4:
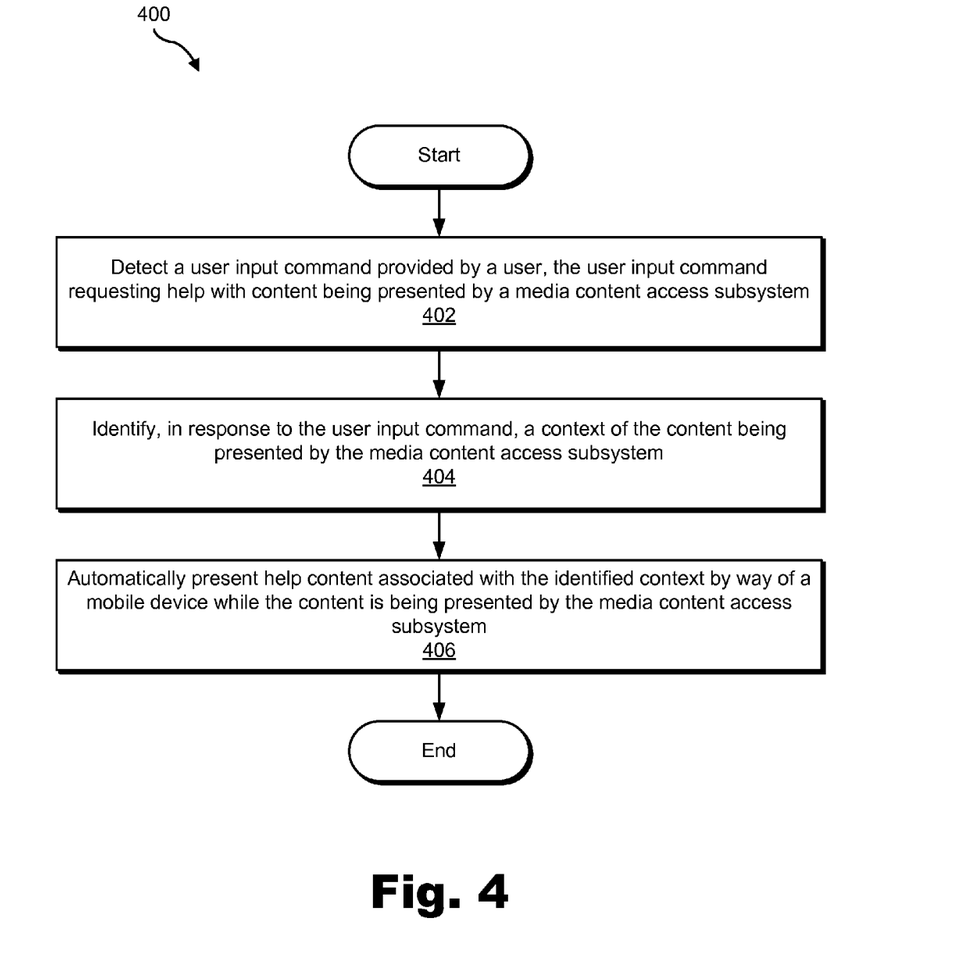
FIG. 4 illustrates an exemplary dynamic help content presentation method according to principles described herein.

FIG. 4 illustrates an exemplary dynamic help content presentation method 400. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100, mobile device 202, media content access subsystem 204, and/or server device 302.

In step 402, a user input command provided by a user and requesting help with content being presented by a media content access subsystem is detected. Step 402 may be performed in any of the ways described herein.

In step 404, in response to the user input command, a context of the content being presented by the media content access subsystem is identified. Step 404 may be performed in any of the ways described herein.

In step 406, help content associated with the identified context is automatically presented by way of a mobile device while the content is being presented by the media content access subsystem. Step 406 may be performed in any of the ways described herein.

Figure 5:
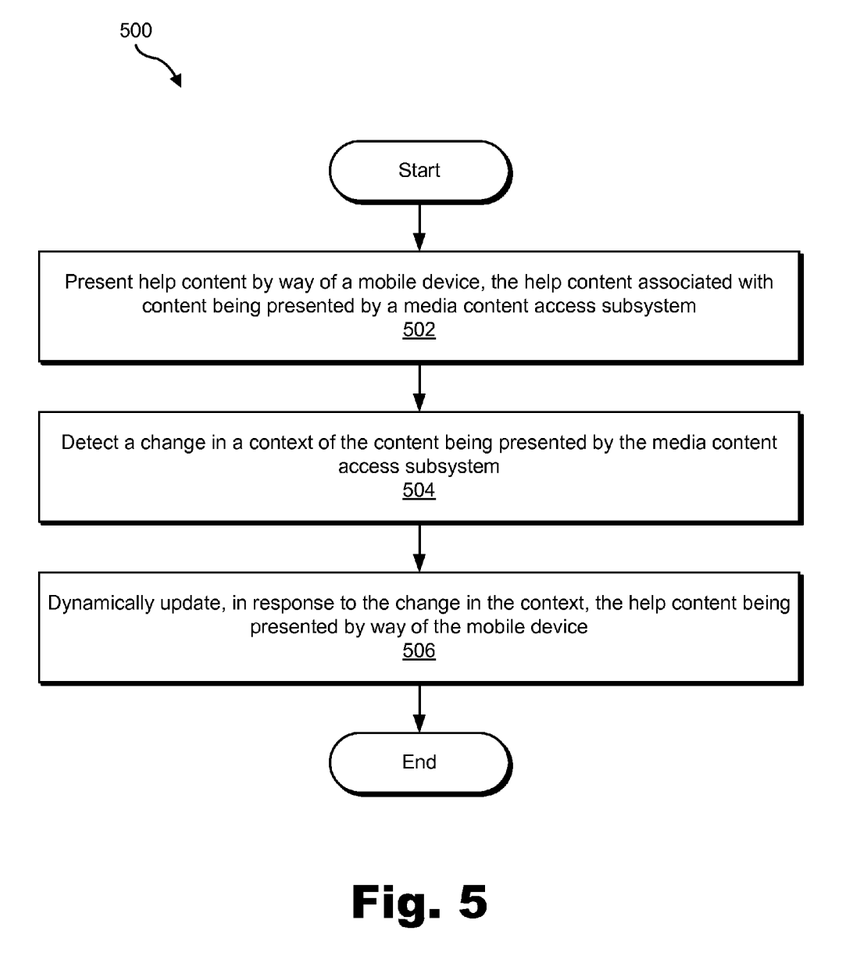
FIG. 5 illustrates another exemplary dynamic help content presentation method according to principles described herein.

FIG. 5 illustrates another exemplary dynamic help content presentation method 500. While FIG. 5 illustrates exemplary steps according to one embodiment, other embodiments may omit, add to, reorder, and/or modify any of the steps shown in FIG. 5. The steps shown in FIG. 5 may be performed by any component or combination of components of system 100, mobile device 202, media content access subsystem 204, and/or server device 302.

In step 502, help content is presented by way of a mobile device. The help content is associated with content being presented by a media content access subsystem and may be presented in response to a user input command requesting help with the content being presented. Alternatively, as will be described below, the help content may be automatically presented even if a user input command requesting help is not provided by a user.

In step 504, a change in a context of the content being presented by the media content access subsystem is detected. Step 504 may be performed in any of the ways described herein.

In step 506, in response to the change in the context, the help content being presented by way of the mobile device is dynamically updated. Step 506 may be performed in any of the ways described herein.

Various examples of the systems and methods described herein will now be presented. It will be recognized that these examples are merely illustrative of the many different possible examples of the systems and methods described herein.

Figure 6:
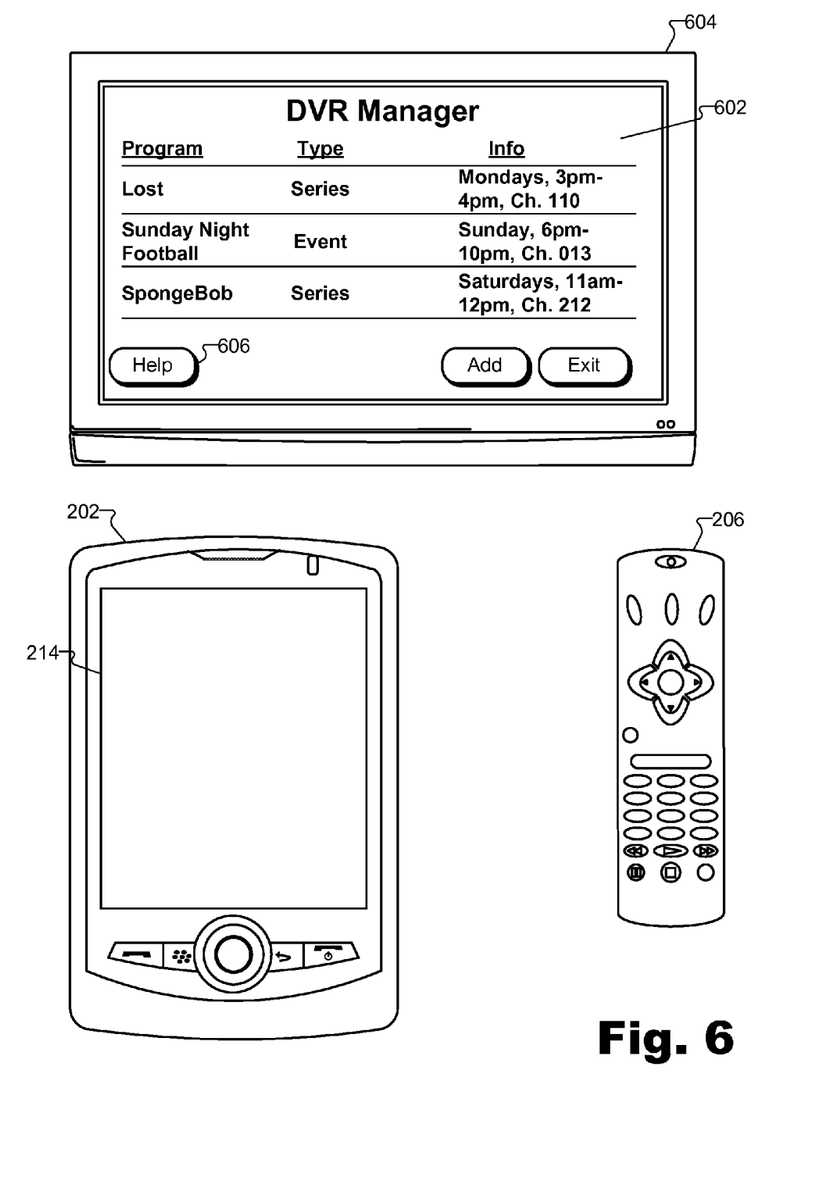
FIGS. 6-9 illustrate various examples of the systems and methods described herein.

FIG. 6 illustrates an exemplary configuration wherein content 602 associated with a DVR feature (e.g., a DVR manager) is displayed by a display device 604 that may be a part of media content access subsystem 204 (i.e., display device 604 may be communicatively coupled to a set-top box device or other type of media content access device configured to present the content by way of display device 604). Content 602 may include a graphical user interface displaying information and one or more options associated with the DVR feature, as shown in FIG. 6, or any other content as may serve a particular implementation.

In some examples, a user may utilize remote control device 206 to provide one or more user input commands associated with the DVR feature. For example, the user may utilize remote control device 206 to navigate within content 602 and/or select one or more options included within content 602.

The user may concurrently utilize mobile device 202 to access help content associated with content 602 displayed by display device 604. For example, the help content may be displayed within display screen 214 while content 602 is displayed by display device 604.

To illustrate, the user may desire to access help content associated with the DVR manager content 602 being displayed by display device 604. To this end, the user may utilize remote control device 206, for example, to select a "help" option 606 displayed within content 602. Alternatively, a dedicated button included on remote control device 206 may be selected to transmit a user input command requesting help with content 602. In response, system 100 may detect the context of content 602 currently being displayed by display device 604 and present associated help content by way of mobile device 202.

Figure 7:
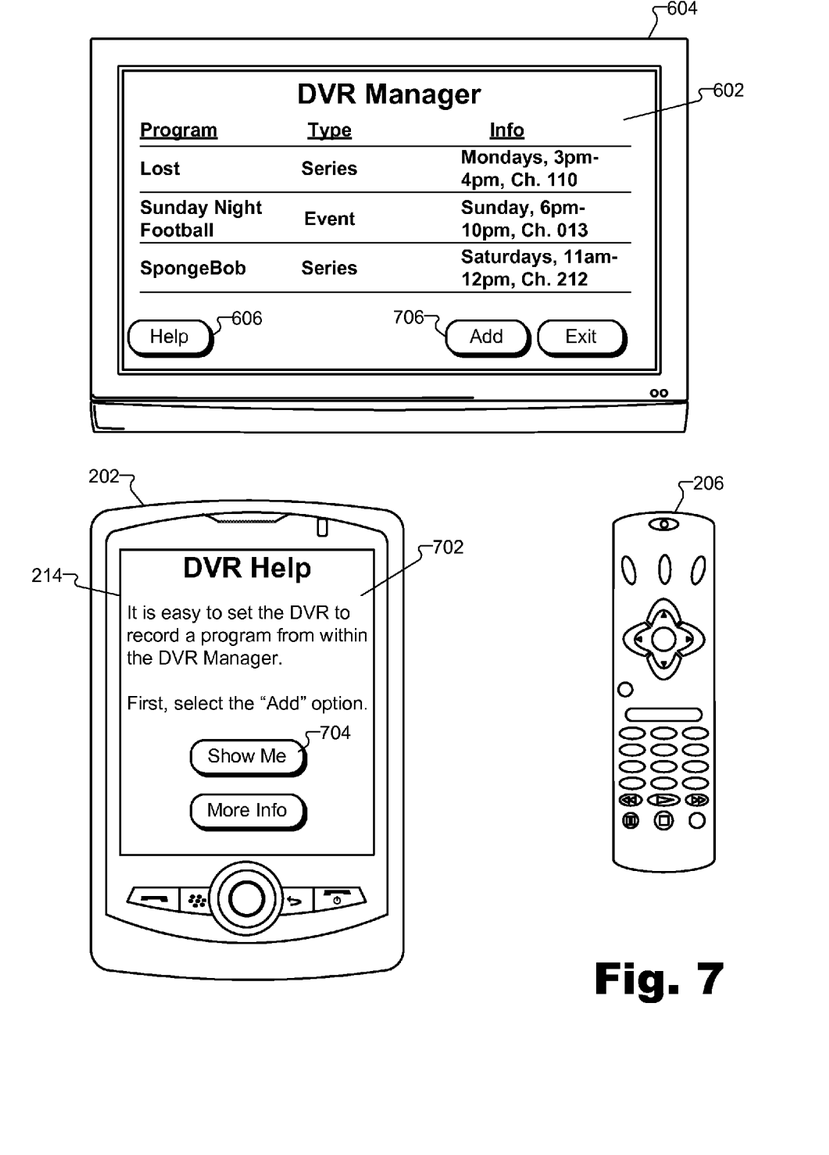

To illustrate, FIG. 7 shows exemplary help content 702 that may be displayed within display screen 214 of mobile device 202 in response to the user input command requesting help with content 602. As shown in FIG. 7, help content 702 is contextually relevant to content 602 displayed by display device 604.

In some examples, help content 702 may be automatically displayed within display screen 214 regardless of whether a user input command requesting help has been provided by the user. For example, system 100 may automatically display help content 702 based on an identity of the user interacting with content 602. To illustrate, a user profile associated with the user may indicate that the user is relatively inexperienced with the DVR feature associated with content 602 or that the user is technologically challenged. Based on this information, system 100 may automatically display and update help content 702 so that the user may more easily learn how to use the DVR feature.

As shown in FIG. 7, help content 702 may include a "show me" option 704 that may be selected by a user to direct system 100 to perform one or more operations described in help content 702. For example, the user may select the "show me" option 704 shown in FIG. 7 to direct system 100 to select an "add" option 706 included in content 602. In this manner, the user may visually learn how to perform the operation. In some examples, a "show me" button or the like may additionally or alternatively be included as part of remote control device 206.

Figure 8:
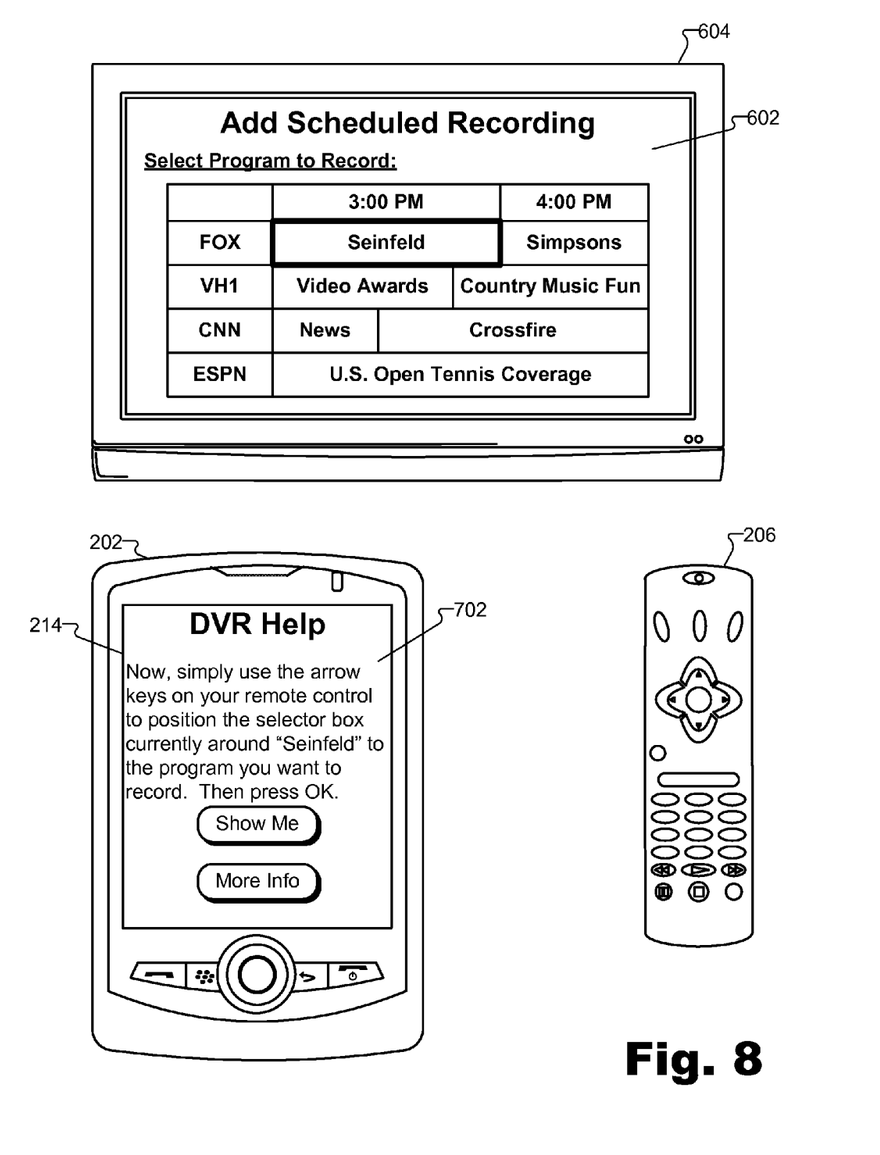

FIG. 8 shows display device 604 after the "add" option 706 has been selected (either by the user or by system 100). As shown in FIG. 8, the context of content 602 has changed in response to the "add" option 706 being selected. System 100 may detect the change in context and dynamically update help content 702 as shown in FIG. 8 so that it remains contextually relevant to content 602.

Figure 9:
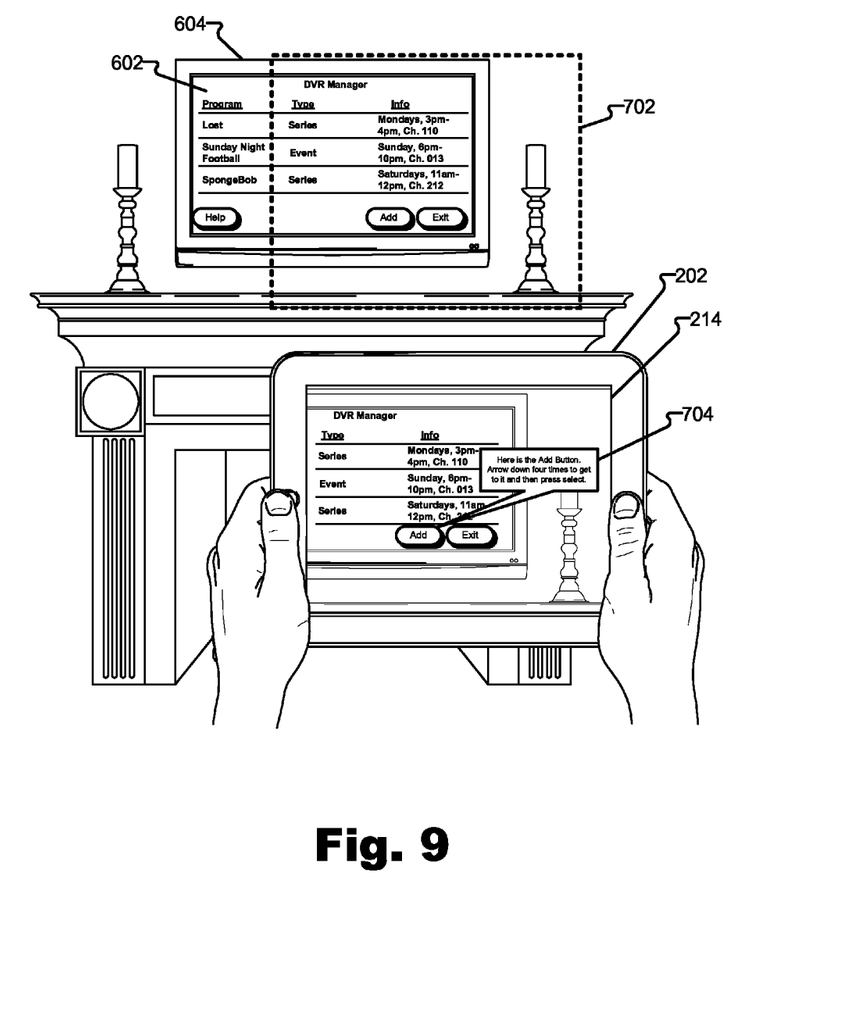

Returning to FIG. 7, user selection of the "show me" option 704 may alternatively direct system 100 to graphically show the user how to perform the operation and/or graphically provide additional instructions by way of mobile device 202. To illustrate, FIG. 9 shows that a user may hold mobile device 202 up so that a camera of mobile device 202 acquires a view 702 display device 604 with content 602 displayed thereon. Mobile device 202 may display the acquired view within display screen 214. Help content 704 may be superimposed on the acquired view so that the user may concurrently view the help content 704 and content 602. System 100 may additionally provide audio content associated with the particular context of content 602. Help content 704 may be dynamically updated in response to user input, a change in content 602, and/or any other factor as may serve a particular implementation.

As mentioned, system 100 may be implemented entirely by a mobile device. For example, a mobile device may include a display screen and a processor communicatively coupled to the display screen. The processor may be configured to detect a user input command provided by a user and requesting help with content being presented by a media content access subsystem, identify a context of the content being presented by the media content access subsystem, and direct the display screen to display help content associated with the identified context while the content is being presented by the media content access subsystem. In some examples, the processor may be further configured to detect a change in the context of the content being presented by the media content access subsystem and, in response, update the help content being presented by the display screen.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
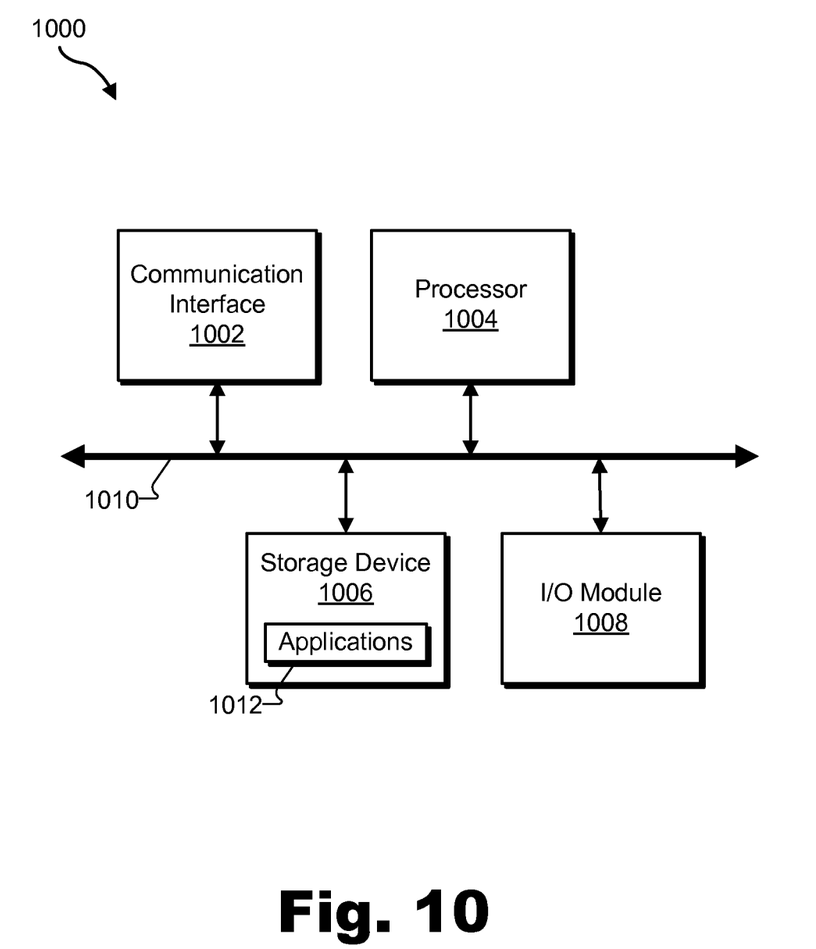
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with detection facility 102, context identification facility 104, and/or help content management facility 106. Likewise, storage facility 108 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by a dynamic help content presentation system, a user input command provided by a user, the user input command requesting help with interactive content being presented by a media content access device, the interactive content comprising at least one of an interactive program guide and a digital video recorder ("DVR") interactive user interface and including a selectable option for accessing a feature associated with the media content access device;

identifying, by the dynamic help content presentation system in response to the user input command, a context of the interactive content being presented by the media content access device;

automatically presenting, by the dynamic help content presentation system, help content associated with the identified context by way of a mobile device physically distinct from the media content access device while the interactive content is being presented by the media content access device, the help content comprising:

a view of at least a portion of the interactive content being presented by the media content access device including the selectable option; and instructions for accessing the feature associated with the media content access device by way of the selectable option, the instructions superimposed on the view of the at least the portion of the interactive content being presented by the media content access device including the selectable option;

detecting, by the dynamic help content presentation system, a user selection of the selectable option of the interactive content presented by the media content access device;

accessing, by the dynamic help content presentation system in response to the detecting of the user selection of the selectable option, the feature associated with the media content access device;

detecting, by the dynamic help content presentation system in response to the accessing of the feature associated with the media content access device, a change in the context of the interactive content being presented by the media content access device; and dynamically updating, by the dynamic help content presentation system in response to the detecting of the change in the context and without additional user input requesting additional help, the help content being presented by way of the mobile device.

2. The method of claim 1, wherein the detecting of the change in the context of the interactive content being presented by the media content access device comprises detecting the user selection of the selectable option transmitted to the media content access device by a remote control device associated with the media content access device.

3. The method of claim 1, wherein the identifying of the context of the interactive content comprises directing the media content access device to transmit data representative of the context of the interactive content to the mobile device.

4. The method of claim 1, wherein the user input command is provided by way of a remote control device separate from the mobile device.

5. The method of claim 1, wherein the dynamic help content presentation system is implemented entirely by the mobile device.

6. The method of claim 1, embodied as computer-executable instructions on at least one non-transitory computer-readable medium.

7. The method of claim 1, wherein the view of the interactive content being presented by the media content access device is acquired by a camera included in the mobile device.

8. The method of claim 1, further comprising:
    detecting, by the dynamic help content presentation system, another user input command provided by the user, the another user input command requesting graphical help with the interactive content being presented by the media content access device,
    wherein the automatically presenting of the help content is performed in response to the detection of the another user input command.

9. A method comprising:
    presenting, by a dynamic help content presentation system, help content by way of a mobile device physically distinct from a media content access device, the help content associated with interactive content being presented by the media content access device, the interactive content comprising at least one of an interactive program guide and a digital video recorder ("DVR") interactive user interface and including a selectable option for accessing a feature associated with the media content access device, and the help content comprising:
        a view of at least a portion of the interactive content being presented by the media content access device including the selectable option; and
        instructions for accessing the feature associated with the media content access device by way of the selectable option, the instructions superimposed on the view of the at least the portion of the interactive content being presented by the media content access device including the selectable option;

detecting, by the dynamic help content presentation system, a user selection of the selectable option of the interactive content presented by the media content access device;

accessing, by the dynamic help content presentation system in response to the detecting of the user selection of the selectable option, the feature associated with the media content access device;

detecting, by the dynamic help content presentation system in response to the accessing of the feature associated with the media content access device, a change in a context of the interactive content being presented by the media content access device; and dynamically updating, by the dynamic help content presentation system in response to the detecting of the change in the context and without additional user input requesting additional help content, the help content being presented by way of the mobile device.

10. The method of claim 9, wherein the detecting of the change in the context of the interactive content being presented by the media content access device comprises detecting the user selection of the selectable option transmitted to the media content access device by a remote control device associated with the media content access device.

11. The method of claim 9, wherein the presenting of the help content is performed automatically based on a user profile associated with a user of the media content access device.

12. The method of claim 9, embodied as computer-executable instructions on at least one non-transitory computer-readable medium.

13. A system comprising:
    at least one computing device including:
        a detection facility that detects a user input command provided by a user, the user input command requesting help with interactive content being presented by a media content access device, the interactive content comprising at least one of an interactive program guide and a digital video recorder ("DVR") interactive user interface and including a selectable option for accessing a feature associated with the media content access device;
        a context identification facility communicatively coupled to the detection facility and that identifies, in response to the user input command, a context of the interactive content being presented by the media content access device; and
        a help content management facility communicatively coupled to the detection facility and the context identification facility and that automatically presents help content associated with the identified context by way of a mobile device physically different from the media content access device while the interactive content is being presented by the media content access device, the help content comprising:
            a view of at least a portion of the interactive content being presented by the media content access device including the selectable option; and
            instructions for accessing the feature associated with the media content access device by way of the selectable option, the instructions superimposed on the view of the at least the portion of the interactive content being presented by the media content access device including the selectable option;

wherein:
the detection facility further detects a user selection of the selectable option of the interactive content presented by the media content access device;
the context identification facility further detects, in response to an accessing of the feature associated with the media content access device, a change in the context of the interactive content being presented by the media content access device; and
the help content management facility further
accesses, in response to the detecting of the user selection of the selectable option, the feature associated with the media content access device, and
updates, in response to the detecting of the change in the context and without additional user input requesting additional help, the help content being presented by way of the mobile device.

14. The system of claim 13, wherein the context identification facility identifies the context of the interactive content by directing the media content access device to transmit data representative of the context of the interactive content to the mobile device.

15. A mobile device comprising:
a display screen; and
a processor communicatively coupled to the display screen and that
detects a user input command provided by a user, the user input command requesting help with interactive content being presented by a media content access device, the interactive content comprising at least one of an interactive program guide and a digital video recorder ("DVR") interactive user interface and including a selectable option for accessing a feature associated with the media content access device, and the media content access device being physically different from the mobile device,
identifies, in response to the user input command, a context of the interactive content being presented by the media content access device,
directs the display screen to display help content associated with the identified context while the interactive content is being presented by the media content access device, the help content comprising:
a view of at least a portion of the interactive content being presented by the media content access device including the selectable option; and
instructions for accessing the feature associated with the media content access device by way of the selectable option, the instructions superimposed on the view of the at least the portion of the interactive content being presented by the media content access device including the selectable option,
detects a user selection of the selectable option of the interactive content presented by the media content access device,
detects, in response to an accessing of the feature associated with the media content access device, a change in the context of the interactive content being presented by the media content access device, and
updates, in response to the detecting of the change in the context and without additional user input requesting additional help, the help content being presented by the display screen.

* * * * *